US011231808B2

(12) United States Patent
Cleary et al.

(10) Patent No.: US 11,231,808 B2
(45) Date of Patent: Jan. 25, 2022

(54) DUAL MEASUREMENT FOR HIGH SENSITIVITY CAPACITIVE SENSING APPLICATIONS AND RELATED SYSTEMS, METHODS AND DEVICES

(71) Applicant: Microchip Technology Incorporated, Chandler, AZ (US)

(72) Inventors: Feargal Cleary, Trim (IE); Rian Whelan, Tara (IE)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/377,612

(22) Filed: Apr. 8, 2019

(65) Prior Publication Data
US 2020/0225829 A1    Jul. 16, 2020

Related U.S. Application Data

(60) Provisional application No. 62/793,003, filed on Jan. 16, 2019.

(51) Int. Cl.
*G06F 3/044* (2006.01)
*G06F 3/041* (2006.01)

(52) U.S. Cl.
CPC .......... *G06F 3/04166* (2019.05); *G06F 3/044* (2013.01); *G06F 3/0418* (2013.01); *G06F 2203/04107* (2013.01); *G06F 2203/04108* (2013.01)

(58) Field of Classification Search
CPC ...... G06F 3/044; G06F 3/0412; G06F 3/0416; G06F 3/041662; G01R 27/2605; G01R 29/12; G01R 29/24
See application file for complete search history.

(56) References Cited

U.S. PATENT DOCUMENTS

| 2010/0259283 A1* | 10/2010 | Togura ................. H03K 17/955 324/679 |
| 2012/0050214 A1 | 3/2012 | Kremin et al. |
| 2013/0285972 A1* | 10/2013 | Elias ..................... G06F 3/0445 345/174 |
| 2013/0335355 A1* | 12/2013 | Ding ....................... H01H 9/12 345/173 |
| 2014/0306924 A1 | 10/2014 | Lin et al. |
| 2015/0261377 A1 | 9/2015 | Reynolds et al. |

(Continued)

OTHER PUBLICATIONS

International Search Report for International Application No. PCT/US2019/056790, dated Dec. 16, 2019, 4 pages.

(Continued)

*Primary Examiner* — Nitin Patel
*Assistant Examiner* — Amen W Bogale
(74) *Attorney, Agent, or Firm* — TraskBritt (57) ABSTRACT

Disclosed embodiments relate, generally, to a dual measurement technique for capacitance sensing, and related systems and methods. In one embodiment, a capacitance sensing method characterized by moisture tolerance is performed and another capacitance sensing method characterized by proximity tolerance is performed. In one embodiment, the method characterized by moisture tolerance is a driven-shield self-capacitance sensing measurement, and the method characterized by proximity tolerance is a grounded-shield self-capacitance sensing measurement.

20 Claims, 7 Drawing Sheets
(5 of 7 Drawing Sheet(s) Filed in Color)

(56) References Cited

U.S. PATENT DOCUMENTS

| | | | | |
|---|---|---|---|---|
| 2016/0154507 A1* | 6/2016 | Bharathan | ............... | G06F 3/014 |
| | | | | 345/174 |
| 2017/0069186 A1* | 3/2017 | Perreau | ................ | H03K 17/955 |
| 2017/0300166 A1* | 10/2017 | Rosenberg | .......... | G06F 3/04144 |
| 2018/0307375 A1* | 10/2018 | Shah | ..................... | G06F 3/0446 |
| 2019/0079613 A1* | 3/2019 | Zhang | .................. | G06F 3/0412 |
| 2019/0121461 A1* | 4/2019 | Recio | ...................... | G06F 3/044 |
| 2019/0227669 A1* | 7/2019 | Maharyta | ............. | G06F 3/0448 |
| 2021/0072048 A1* | 3/2021 | Sobukawa | ........... | G01D 5/2417 |

OTHER PUBLICATIONS

International Written Opinion for International Application No. PCT/US2019/056790, dated Dec. 16, 2019, 8 pages.

\* cited by examiner

DUAL MEASUREMENT FOR HIGH SENSITIVITY CAPACITIVE SENSING APPLICATIONS AND RELATED SYSTEMS, METHODS AND DEVICES

CROSS-REFERENCE TO RELATED APPLICATIONS

This application claims priority to and the benefit of the filing date of U.S. Provisional Patent Application Ser. No. 62/793,003, filed Jan. 16, 2019, the entire contents and disclosure of which are hereby incorporated herein by this reference.

TECHNICAL FIELD

Disclosed embodiments relate, generally, to capacitive sensing, and more specifically, to measurement techniques for high sensitivity capacitive sensing applications and related systems, methods and devices.

BACKGROUND

A typical touch interface system may incorporate touch sensors (e.g., capacitive sensors and/or resistive sensors, without limitation) that respond to an object in close proximity to, or physical contact with, a contact sensitive surface of a touch interface system. Such responses may be captured and interpreted to infer information about the contact, including a location of an object relative to the touch interface system.

Touchpads used with personal computers, including laptop computers and keyboards for tablets, often incorporate or operate in conjunction with a touch interface system. Displays often include touch screens that incorporate elements (typically at least a touch sensor) of a touch interface system to enable a user to interact with a graphical user interface (GUI) and/or computer applications. Examples of devices that incorporate a touch display include portable media players, televisions, smart phones, tablet computers, personal computers, and wearables such as smart watches, just to name a few. Further, control panels for automobiles, appliances (e.g., an oven, refrigerator or laundry machine) security systems, automatic teller machines (ATMs), residential environmental control systems, and industrial equipment may incorporate touch interface systems with displays and housings, including to enable buttons, sliders, wheels, and other touch elements.

Depending on an end-use, touch interface systems are used in environments that vary in terms of exposure (e.g., water, sand, and/or crayons, without limitation), temperature, and noise. For example, for some applications a touch interface system may be used in temperatures ranging from −40 to 40 degrees Celsius, and so sensitivity of such touch interface systems needs to be set so that touches from both bare and gloved fingers are detected. By way of another example, for some applications a touch interface system may be used in an area where people reach past a display but do not intend to use a display, so inadvertent proximity detection needs to be rejected. Successful operation in light of different sensitivity and environmental requirements are sometimes challenging to balance.

BRIEF DESCRIPTION OF THE DRAWINGS

The purpose and advantages of the various embodiments of the disclosure will be apparent to one of ordinary skill in the art from the detailed description in conjunction with the appended figures. The patent or application file contains at least one drawing executed in color. Copies of this patent or patent application publication with color drawing(s) will be provided by the Office upon request and payment of the necessary fee.

DETAILED DESCRIPTION

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, and symbols that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, and/or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

As understood for purposes of the embodiments described in this disclosure, a capacitive sensor may respond to an object's (such as a finger or a stylus) contact with, or the object's proximity to, a contact-sensitive area of the capacitive sensor. In this disclosure "contact" and "touch" are meant to encompass both an object's physical contact with a contact-sensitive area (e.g., an electrode or one or more overlays covering an electrode or group of electrodes, without limitation) and an object's presence within proximity of a contact-sensitive area without physical contact. Actual physical contact with a capacitive sensor is not necessarily required.

By way of an example, when an object contacts a capacitive sensor, a change in capacitance may occur within the capacitive sensor at or near the location of the contact. An analog acquisition front-end may "detect" the contact if it meets a certain threshold. "Charge-then-transfer" is a technique implemented in some touch-acquisition front-ends for detecting capacitive changes, whereby a sensing capacitor is charged responsive to a change in capacitance (e.g., charged faster or slower) and a charge is transferred to an integrating capacitor over multiple charge-transfer cycles. An amount of charge associated with such a charge-transfer may be converted to digital signals by an analog-to-digital converter (ADC), and a digital controller may process those digital signals (typically referred to as "delta counts" or just "deltas") to determine measurements and if an object contacted a sensor.

Self-capacitance sensors (also referred to herein as "self-cap sensors") are capacitive field sensors that respond to changes in capacitance to ground. They are typically laid out in an array of rows and columns that react independently to a touch. By way of non-limiting example, a self-cap sensor may include a circuit employing repetitive charge-then-transfer cycles using common integrated CMOS push-pull driver circuitry having floating terminals.

Mutual capacitance sensors are capacitive field sensors that detect/respond to changes in capacitance between two electrodes: a drive electrode and a sense electrode. The drive electrode and sense electrode pairs at each intersection of drive and sense lines form a capacitor. Self-capacitance and mutual capacitance techniques may be used in the same touch interface system, and complimentary to each other, for example, self-capacitance may be used to confirm a touch detected using mutual capacitance.

An example touch sensors may be overlaid in a 2-dimensional (2-D) arrangement for a 2-D contact sensitive surface that may be incorporated into a contact sensitive surface— for example, of a touch pad or a display screen—and may facilitate user interaction with an associated appliance. Insulating protective layers (e.g., resins, glass, and/or plastic, without limitation) may be used to cover touch sensors and may be referred to herein as an "overlay." As used herein, a "touch display" is a display (such as a liquid crystal display (LCD), thin-film-transistor (TFT) LCD, or a light emitting diode (LED) display) that incorporates 2-D touch sensors.

Using the example of a touch screen sensor that uses a matrix sensor approach of mutual capacitance sensors employing charge-transfer techniques, drive electrodes may extend in rows on one side of a substrate and sense electrodes may extend in columns on the other side of the substrate so as to define a "matrix" array of N by M nodes. Each node corresponds to an intersection between the electrically conductive lines of a drive electrode and of a sense electrode. A drive electrode simultaneously drives all of the nodes in a given row and a sense electrode senses all of the nodes in a given column. The capacitive coupling of the drive electrode and sense electrode (mutual capacitance), or the coupling of a sense electrode and ground (self-capacitance), at a node position may be separately measured or both measured in response to a capacitive change indicative of a touch event. For example, if a drive signal is applied to the drive electrode of row 2 and a sense electrode of column 3 is active then the node position is: row 2, column 3. Nodes may be scanned by sequencing through different combinations of drive and sense electrodes. In one mode the drive electrodes may be driven sequentially while the sense electrodes are all continuously monitored. In another mode each sense electrode may be sampled sequentially.

By way of non-limiting example, touch processors and touch acquisition circuitry may be microcontrollers, digital logic circuits, and/or configurable state machines, which may be configured to control the drive electrodes and analyze capacitive effects (e.g., detected from measured changes in channel capacitance and/or absolute channel capacitance, without limitation) on a touch sensor. Integrated Circuit (IC) packages that include a microcontroller may provide the input and output pins to communicate with a host; as well as the firmware to perform techniques and operations, including those described herein, in connection with various embodiments. Examples of microcontrollers that may be used with the various embodiments of this disclosure includes peripheral interface microcontrollers, ARM-based microcontrollers, and AVR-8 and 32-bit microcontrollers.

Self-cap sensors are sometimes implemented with a "grounded-shield" to isolate a touch sensor from sources of electro-magnetic interferences (EMI), and provide directionality to a touch sensor through field shaping (i.e., prevents rear side activation). Structurally, grounded-shielding involves positioning a grounded-shield (typically a grounded conductive material) behind or surrounding an electrode to contain an electric field emanating from an electrode.

Grounded-shields are sometimes used for touch sensor applications requiring low sensitivity, that is, a requirement to respond to objects close to the surface. More specifically, grounded-shields generally reduce sensitivity by containing an emanating electric field, for example, so that it is close to a dielectric overlay. States another way, grounded-shields reduce projection of an electric field and so reduce a range of distance (e.g., from an overlay) for which proximity maybe detected. Herein, reducing projection of an electric field may also be referred to as reducing "strength" of an electric field. Containing an electric field enables sensing while reducing unwanted proximity detections, that is, a detection that is farther away from a touch sensor than an acceptable distance (acceptable typically defined based on requirements for a specific application). Grounded-shields reduce projection of the electric field (and reduce the strength of an electric field), and so reduce a range of distance for which proximity detection may be experienced.

However, grounded-shield sensors may still detect invalid touches from foreign objects such as moisture on the touch sensor. By way of further explanation, at least two capacitive couplings are known to occur with self-cap sensors that implement a grounded-shield. A first capacitive coupling is an earth return and is: electrode to finger to earth (also referred to as "free space") path that is typically used to detect capacitive changes in self-cap measurements. A second capacitive coupling is called a ground return and is: electrode to finger to ground-shield to ground path. Moisture does not create a capacitive coupling for the earth return path, however, it may create a capacitive coupling for the ground return path and charge may be drawn down the second path, and so, to a touch processor, moisture is indistinguishable from a finger. In other words, invalid touches may be detected based on moisture on a touch sensor. So, while a grounded-shield sensor has an advantage of reduced projection and reduced proximity effects (e.g., unwanted proximity detection), it is susceptible to detecting invalid touches when moisture is on a sensor.

Self-cap sensors are sometimes implemented with a "driven shield" to isolate a touch sensor from sources of electro-magnetic interferences (EMI), provide directionality to a touch sensor, and/or improve tolerance for foreign objects such as moisture. A typical example of a driven shield is to incorporate an active shield (i.e., a conductive material) behind or surrounding an active electrode to continuously track (i.e., drive to the same voltage potential) sense electrode and drive electrode voltage potentials for all other electrodes or a subset of neighboring electrodes of a sensor. An effect of a driven-shield technique is that there is no or inconsequential capacitive coupling from sensor to moisture to shield, and so moisture is not detected as a touch. In the case of a touch while moisture is on a sensor, most if not all available field generated by the sensor is coupled to the finger, increasing the influence on the sensor, thereby increasing sensitivity and signal to noise ratio (SNR). Notably, an electric field around a touch sensor can project further, allowing design of close proximity sensors (i.e., sensors that detect touches for objects close to but not physically touching a sensor). However, increased projection of an electric field may cause unintended proximity detection, especially in high sensitivity applications.

Figure 1A:
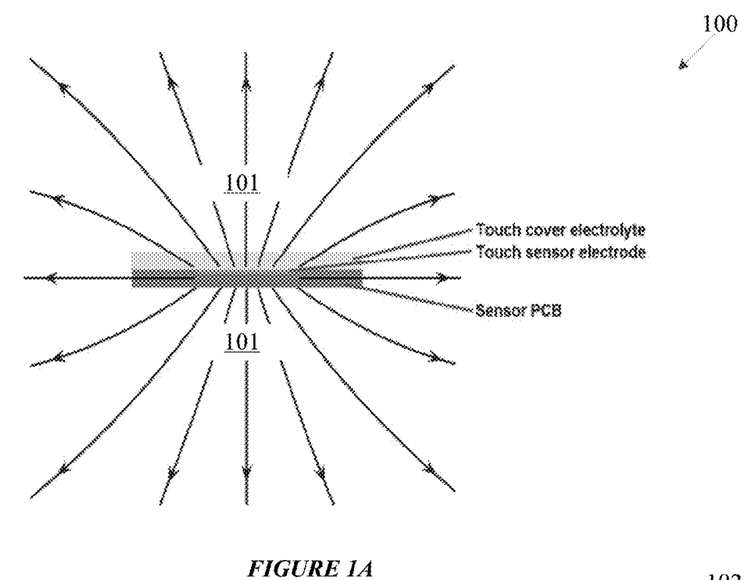
FIGS. 1A, 1B, and 1C show examples of electric fields projecting from an isolated sensor, a ground-shield sensor, and a driven-shield sensor.
Figure 1B:
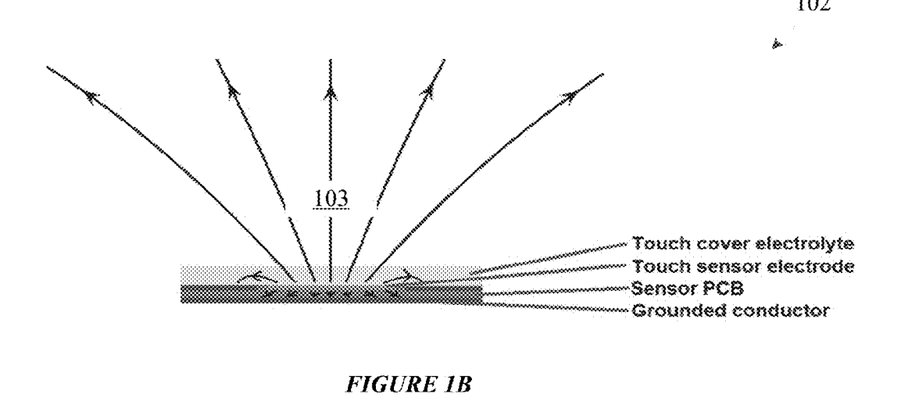
Figure 1C:
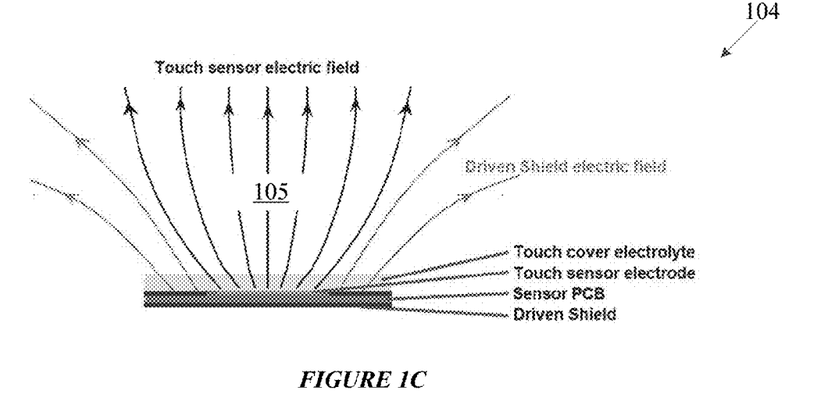

FIGS. 1A, 1B and 1C show electric fields emanating from example touch sensors. FIG. 1A shows an isolated sensor (i.e., no shield is implemented), FIG. 1B shows a grounded-shield sensor, and FIG. 1C shows a driven-shield sensor. In each of FIGS. 1A, 1B and 1C, electric fields and their directionality are shown by solid arrows coming out of the touch sensors. Strength of electric fields is shown by a number of arrows, so, electric field 103 emanating from sensor 102 (FIG. 1B) is weaker than both electric field 101 emanating from sensor 100 (FIG. 1A) and electric field 105 emanating from sensor 104 (FIG. 1C).

The inventors of this disclosure appreciate that neither grounded-shield techniques nor driven-shield techniques, alone, are suitable for applications that require high sensitivity, reduced electric field projection, and moisture rejection. The inventors of this disclosure appreciate a need for touch processors that may be used for many applications, including high sensitivity applications that require proximity detection rejection and moisture rejection.

Accordingly, one or more embodiments of the disclosure relate, generally, to dual-touch measurement sensing techniques, and more specifically to using a proximity rejection technique in conjunction with a moisture rejection technique to detect touches. In one embodiment, a first measurement is performed either (i) using a driven-shield self-cap measurement (also referred to herein as "driven-shield self-cap mode"), or (ii) grounding a shield and then using a self-cap measurement (also referred to herein as "grounded-shield self-cap mode"); and then a second measurement is performed using the other of the driven-shield self-cap mode or grounded-shield self-cap mode. A touch is detected if both measurements detect a touch.

Figure 2:
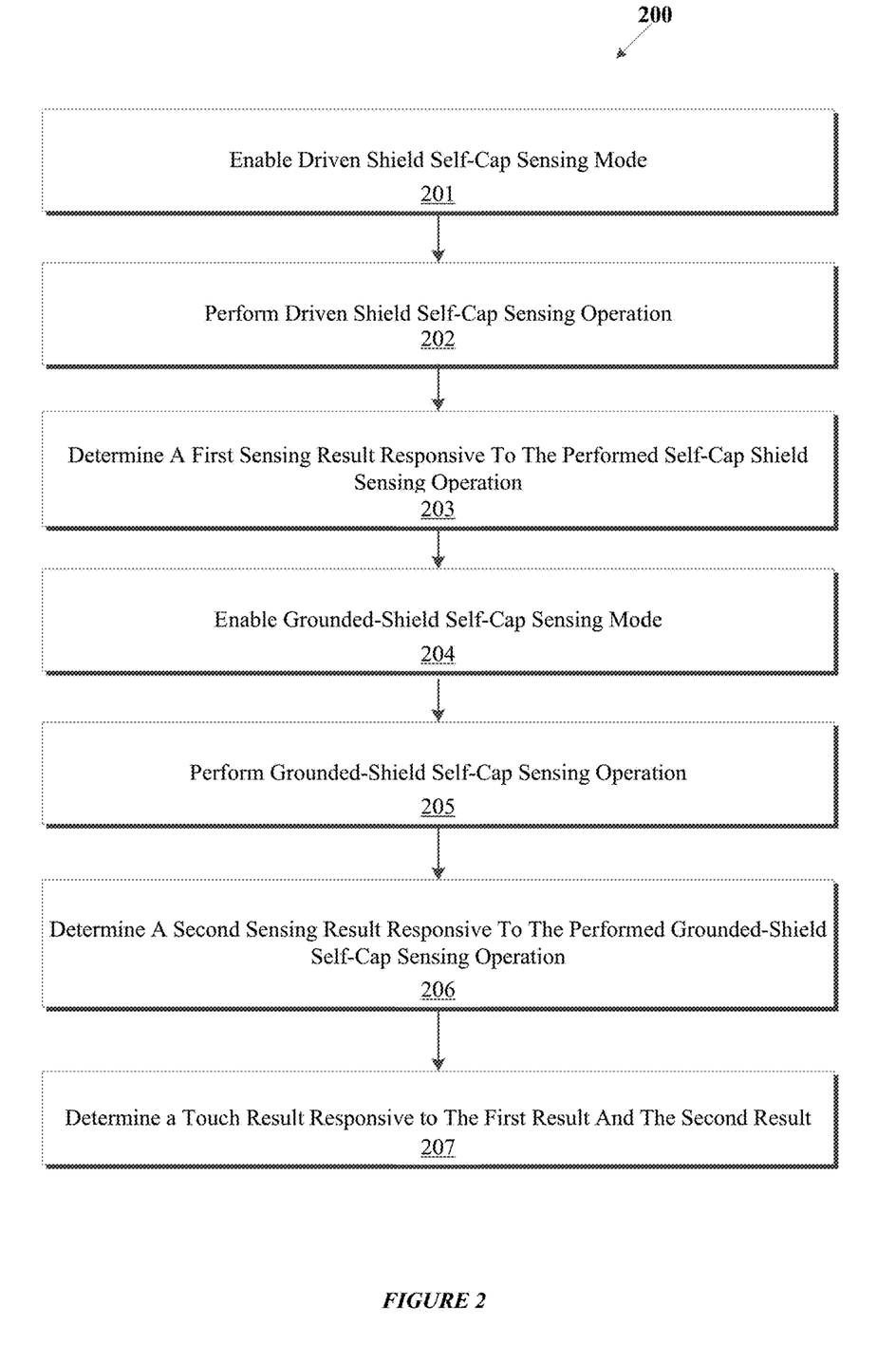
FIG. 2 shows a process for dual touch measurement sensing, in accordance with one or more embodiments of the disclosure.

FIG. 2 shows a process 200 for dual-touch measurement sensing, in accordance with one or more embodiments of the disclosure. In operation 201, a driven-shield self-cap sensing mode is enabled. A driven-shield self-cap sensing mode may be associated with self-cap sensing techniques that implement a driven shield, including those techniques described herein. In operation 202, a driven-shield self-cap sensing operation is performed. In operation 203, a sensing result of the driven-shield self-cap sensing operation is determined. The sensing result may be, for example, a value indicative of a touch detected or no touch detected. In a case of a touch detected sensing result, a location of a touch may also be stored. For example, in a case of a touch display, if a touch is detected during operation 202, location information corresponding to coordinates of a physical location on the touch display where a touch was detected may also be stored. In operation 204, a grounded-shield self-cap sensing mode is enabled. In one or more embodiments, enabling a grounded-shield self-cap sensing mode may include grounding a shield of a sensor and enabling a self-cap sensing mode. Such a self-cap sensing mode may be associated with self-cap sensing techniques that do not include using a driven-shield. In operation 205, a grounded-self-cap sensing operation is performed. In one or more embodiments, performing a grounded-shield self-cap sensing operation may include performing self-cap sensing techniques. In operation 206, a sensing result of the grounded-self-cap sensing operation is determined. The sensing result may indicate touch detected or no touch detected, and if a touch was detected, may include location information associated with a detected touch. In operation 207, a touch result is determined responsive to the first result and the second result. In one embodiment, a touch result is a detected touch if both the sensing result of the driven-shield self-cap sensing operation and the sensing result of the grounded-shield self-cap sensing operation are a touch detected. Further, a touch result is not detected if either the sensing result of the driven-shield self-cap sensing operation or the sensing result of the grounded-shield self-cap sensing operation is a no touch detected. In one embodiment, a touch result is a detected touch if both the sensing result of the driven-shield self-cap sensing operation and the sensing result of the grounded-shield self-cap sensing operation are a touch detected for the same location information and a touch result is not detected if either the sensing result of the driven-shield self-cap sensing operation or the sensing result of the grounded-shield self-cap sensing operation is a no touch detected for the same location information.

Figure 3:
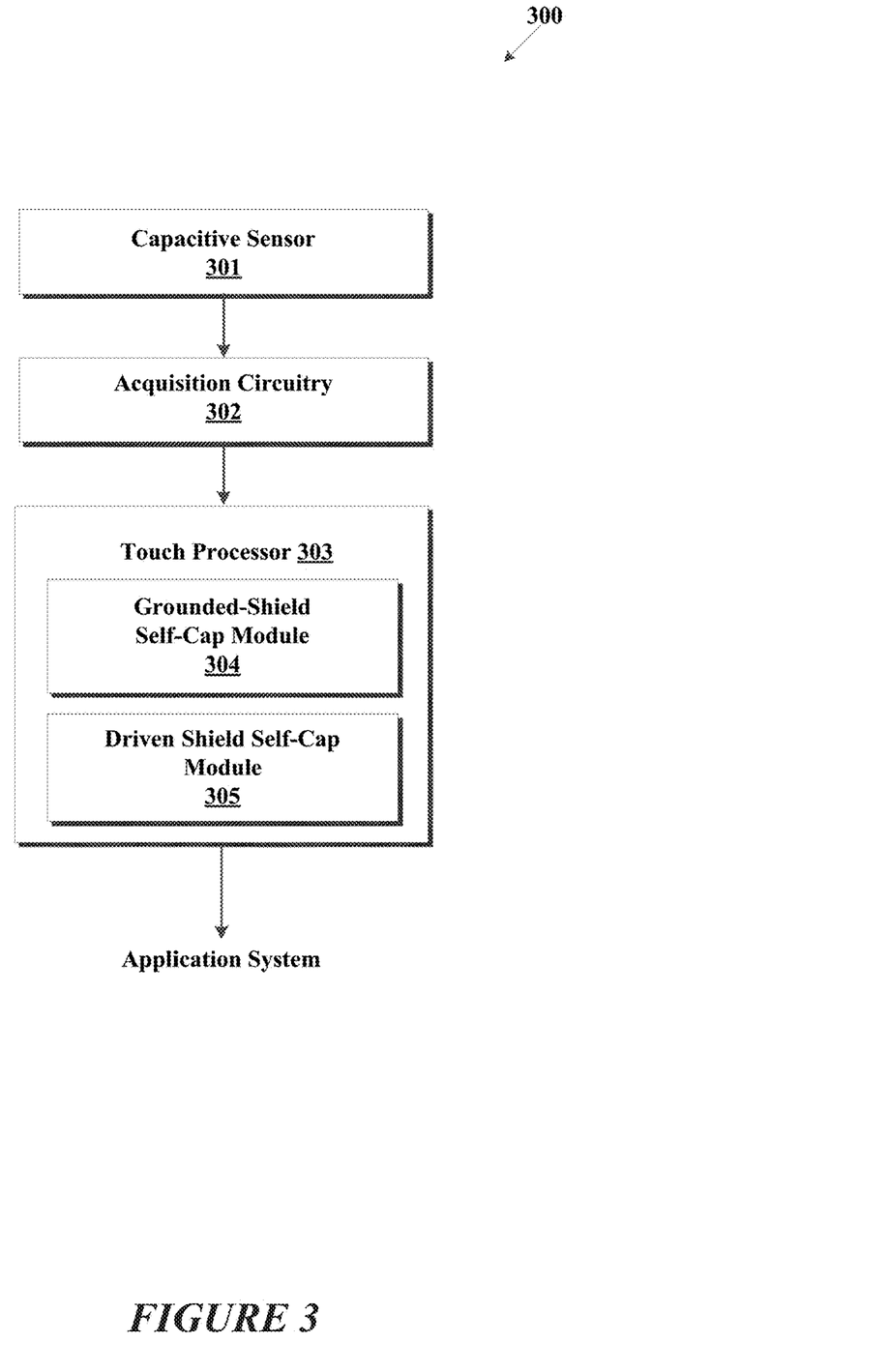
FIG. 3 shows an example touch interface system 300 configured for dual measurement sensing techniques, in accordance with one or more embodiments of the disclosure.

FIG. 3 shows an example touch interface system 300 configured for dual measurement sensing techniques, in accordance with one or more embodiments of the disclosure. In one or more embodiments, touch interface system 300 may include capacitive sensor 301, acquisition circuitry 302, and touch processor 303. Touch processor 303 may be configured, generally, to detect touches at a touch sensor such as capacitive sensor 301. In one or more embodiments, touch processor 303 may include grounded-shield self-cap sensing module 304 and driven-shield self-cap module 305. Touch processor 303 may be configured to detect touches at capacitive sensor 301 responsive to results (i.e., detect touches) by grounded-shield self-cap sensing module 304 and driven-shield self-cap module 305.

Grounded-shield self-cap sensing module 304 may be configured, generally, for performing one or more grounded-shield self-cap sensing techniques, including those described herein. Driven-shield self-cap module 305 may be configured, generally, for performing one or more driven-shield self-cap sensing techniques, including those described herein. While only grounded-shield self-cap sensing module 304 and driven-shield self-cap module 305 are shown in FIG. 3, it is specifically contemplated that touch processor 303 may be configured to perform other capacitive sensing techniques. By way of example, touch processor 303 may include a mutual cap sensing module for performing mutual capacitive sensing operations, and dual measurement sensing techniques may be used to confirm results of the mutual capacitive sensing module—e.g., confirming detection of a touch using mutual capacitive sensing.

Figure 4A:
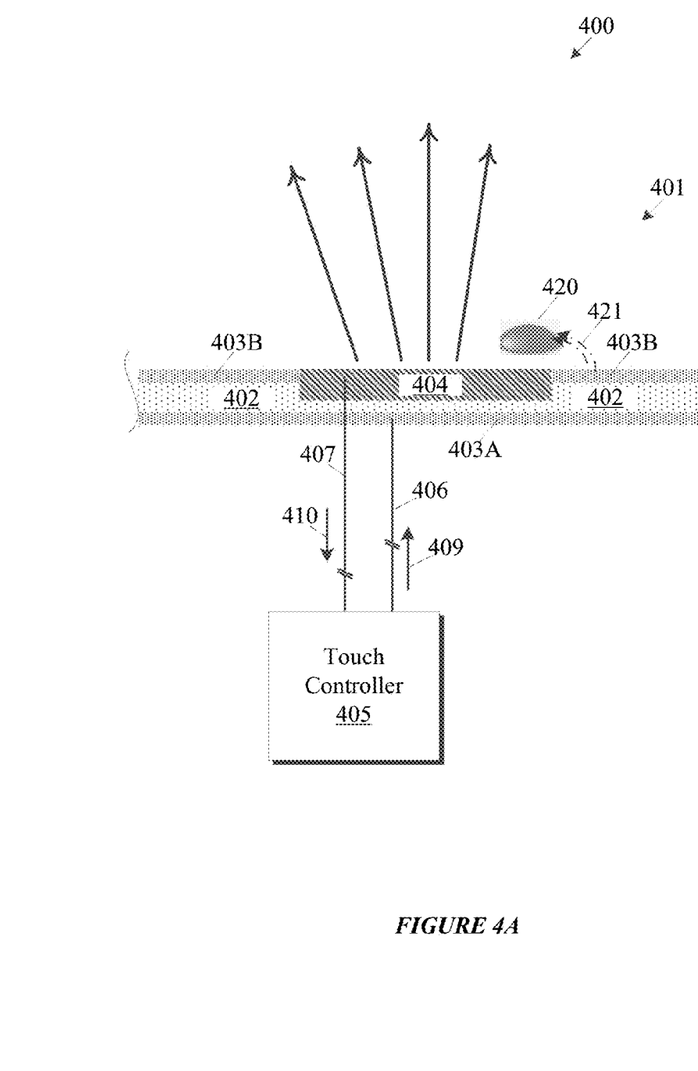
FIGS. 4A and 4B show dual measurement sensing operations, for example, touch-sensing circuitries, in accordance with one or more embodiments of the disclosure.
Figure 4B:
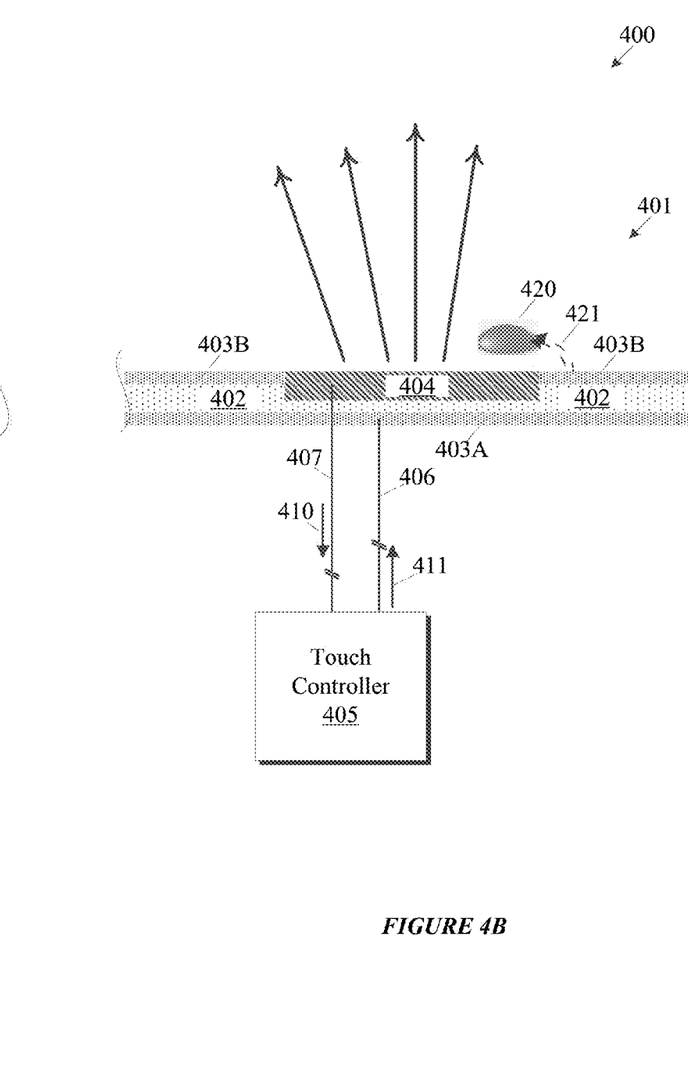
Figure 5A:
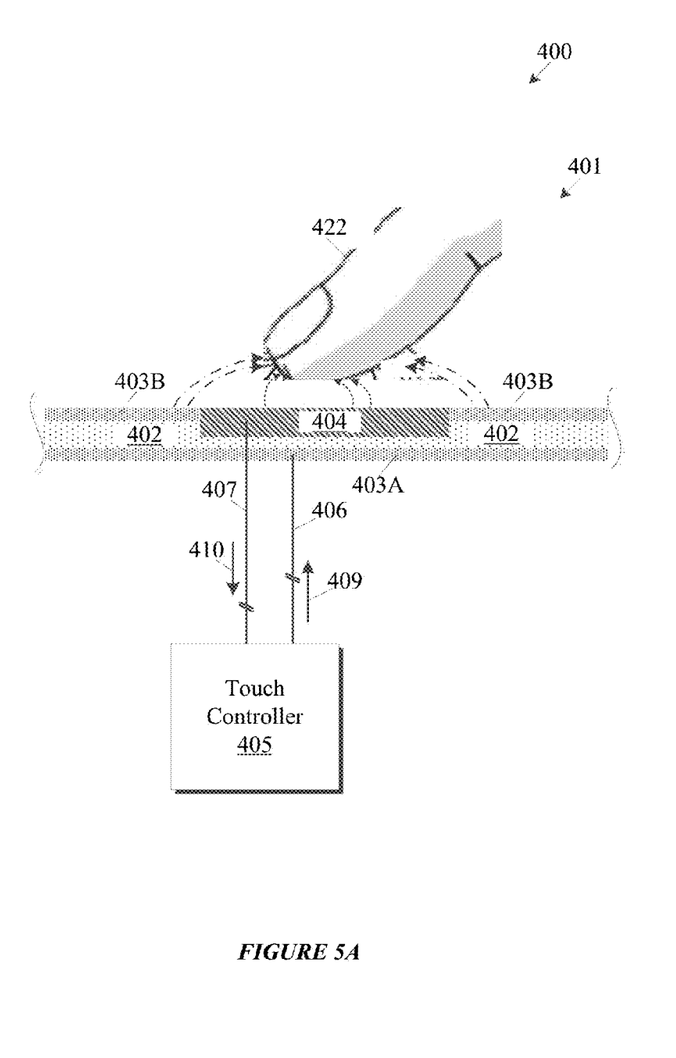
FIGS. 5A and 5B show dual measurement sensing operations, for example, touch-sensing circuitries, in accordance with one or more embodiments of the disclosure.
Figure 5B:
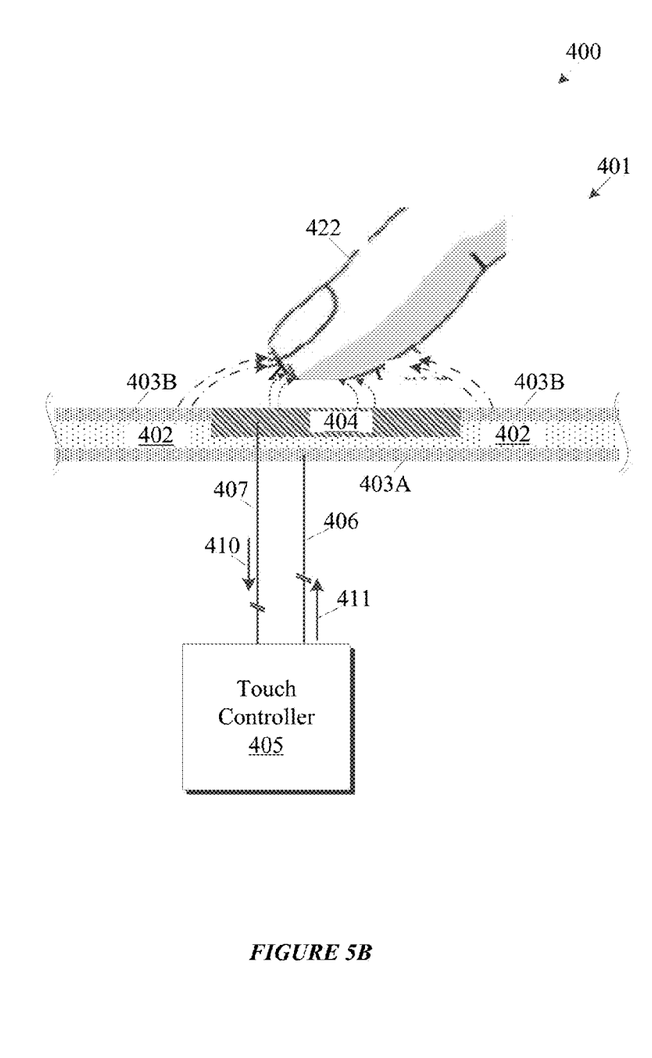

FIGS. 4A, 4B, 5A and 5B show dual measurement sensing operations, for example, touch-sensing circuitries, in accordance with one or more embodiments of the disclosure. FIGS. 4A and 4B show an example dual measurement sensing operation without a valid touch and water on an electrode of a touch sensor. FIGS. 5A and 5B show an example dual measurement sensing operation with a valid touch by a finger.

In the embodiments shown in FIGS. 4A and 4B, touch-sensing circuitry system 400 includes touch sensor 401 and touch controller 405 operatively coupled to touch sensor 401. In one or more embodiments, touch sensor 401 includes conductive structure 404, substrate material 402, and back conductive material 403A and front conductive material 403B. Substrate material 402 may be, for example, any insulating material, including low-loss substrates such as printed circuit board (PCB) materials (e.g., FR4, CEM-1, Polyamide, and Kapton, without limitation), acrylics such as Polyethylene Terephthalate (PET) and Polycarbonate, and/or glass.

In one or more embodiments, conductive structure 404 may be an electrode formed, for example, by a conductive fill on substrate material 402. Conductive structure 404 may be, for example, copper, carbon, silver ink, Orgacon™, indium tin oxide (ITO) coated glass, and/or a suitable conductive material characterized by substantially 1 kΩ/sq resistivity so that an RC time constant may be controlled.

In one or more embodiments, back conductive material 403A and front conductive material 403B may be disposed on opposing sides of substrate material 402. Back and/or front conductive materials 403A and/or 403B may extend within parallel planes. In one or more embodiments, there may be additional conductive materials disposed on lateral sides of substrate material 402. Back conductive material 403A and front conductive material 403B may join or be continuous with such additional lateral materials.

In one or more embodiments, back conductive material 403A may be arranged relative to substrate material 402 and conductive structure 404 to facilitate directionality of an electric field projecting from conductive structure 404. In one embodiment, back conductive material 403A may be positioned co-planar a bottom-surface of substrate material 402 opposite conductive structure 404 such that an electric field projecting from conductive structure 404 projects farther in a direction opposite back conductive material 403A, or in other words such that back conductive material 403A blocks (or reduces) projection of an electrical field from conductive structure 404 in a direction from a surface of touch sensor 401 toward back conductive material 403A.

In one or more embodiments, front conductive material 403B may be arranged relative to substrate material 402 to further provide directionality and/or to isolate touch sensor 401 from other nearby sensors or electronics. Front conductive material 403B may define one or more openings (shown in FIGS. 4A and 4B, but not labeled) to facilitate projection of an electric field from conductive structure/electrode 404.

In one or more embodiments, touch controller 405 may be configured, generally, to perform dual measurement techniques in accordance with one or more embodiments of the disclosure. By way of example, touch controller 405 may implement touch processor 303, grounded-shield self-cap sensing module 304, and driven-shield self-cap module 305 shown in FIG. 3. In the examples shown in FIGS. 4A, 4B, touch controller 405 is operatively coupled by one or more conductive lines to touch sensor 401, more specifically, touch controller 405 is operatively coupled to conductive structure/electrode 404 by sense line 407, and operatively coupled to conductive material 403A, 403B by shield line 406.

FIG. 4A shows touch-sensing circuitry system 400 during a first measurement of a dual measurement sensing operation while moisture 420 is present at conductive structure/electrode 404 and there is a capacitive coupling 421 between moisture 420 and conductive material 403A, 403B. In the embodiment discussed with reference to FIGS. 4A and 4B, the first measurement is a driven-shield self-cap measurement and the second measurement is a grounded-self-cap measurement, but embodiments of the present disclosure do not require that driven-shield self-cap measurement and grounded-shield self-cap measurement be performed in a specific order. So, during the first measurement, touch controller 405 provides driven-shield signal 409 to conductive material 403A, 403B, and causes conductive material 403A, 403B to have a driven-shield voltage.

In one embodiment, touch controller 405 synchronizes (i.e., tracks a voltage potential) driven-shield signal 409 to one or more measurement signals 410 on conductive structure/electrode 404. Measurement signals 410 are indicative of capacitance changes of touch sensor 401, and received via sense line 407 and stored by touch controller 405. Because of the driven-shield signal 409, capacitive coupling 421 is blocked or at least does not contribute to a self-cap measurement, so no touch is detected by touch controller 405 due to moisture 420 at conductive structure/electrode 404.

Notably, additional signal lines for tracking voltages related to nearby sensors in order to provide a driven shield may also be included in touch-sensing circuitry system 400 (FIGS. 5A and 5B), but are omitted in this discussion simply to improve clarity.

FIG. 4B shows touch-sensing circuitry system 400 during a second measurement of a dual measurement sensing operation while moisture 420 is present at conductive structure/electrode 404 and there is a capacitive coupling 421 between moisture 420 and conductive material 403A, 403B. The second measurement is a grounded-self-cap shield measurement, and so touch controller 405 provides ground voltage 411 to conductive material 403A, 403B via shield line 406, and causes conductive material 403A, 403B to have a voltage potential equal to ground. A measurement is made responsive to measurement signals 410 received over sense line 407 and stored by touch controller 405. Here, the capacitive coupling 421 is detected as a touch by touch controller 405 for the reasons already explained. So, the result of the grounded-shield self-cap measurement is detection of an invalid touch.

Once touch controller 405 has completed both measurements, touch controller 405 then determines whether a touch occurred. In this example, no touch is detected by the driven-shield self-cap measurement and a touch is detected by the grounded-self cap measurement, so dual measurement logic of touch controller 405 determines that no touch occurred because the results of the two measurement are not the same, and touch controller 405 detects no touch.

FIGS. 5A and 5B show a touch-sensing circuitry system 400 during a dual measurement sensing operation where a finger 422 is contacting touch sensor 401. Notably, a touch is detected for both a self-cap driven-shield measurement and a grounded-shield self-cap measurement, so touch controller 405 detects a touch, and in this case, it is a valid touch.

In embodiments where touch controller 405 is implemented as a microcontroller, one or more of sense line 407 and shield line 406 may be operatively coupled to a general purpose input/output (GPIO) pin or peripheral input/output (I/O) pin of the microcontroller, and grounded-shield self-cap sensing module 304 and driven-Shield Self-Cap Module 305 may implemented in firmware of the microcontroller. In one embodiment, touch controller 405 may include internal circuitry for providing a ground signal to a GPIO pin, and so can use such internal circuitry to provide a ground voltage to conductive material 403A, 403B.

One or more embodiments of the disclosure relate, generally, to a method of calibrating a touch processor for dual measurement sensing for low and high sensitivity applications. Driven-shield self-cap measurements and grounded-shield self-cap measurements are performed under a variety of conditions—some that require high sensitivity, some that require lower sensitivity, and both with and without moisture. Since the strength of a capacitive coupling is proportional to delta counts for charge-transfer, delta counts may be used to determine a threshold or threshold range for detecting a touch.

Figure 6:
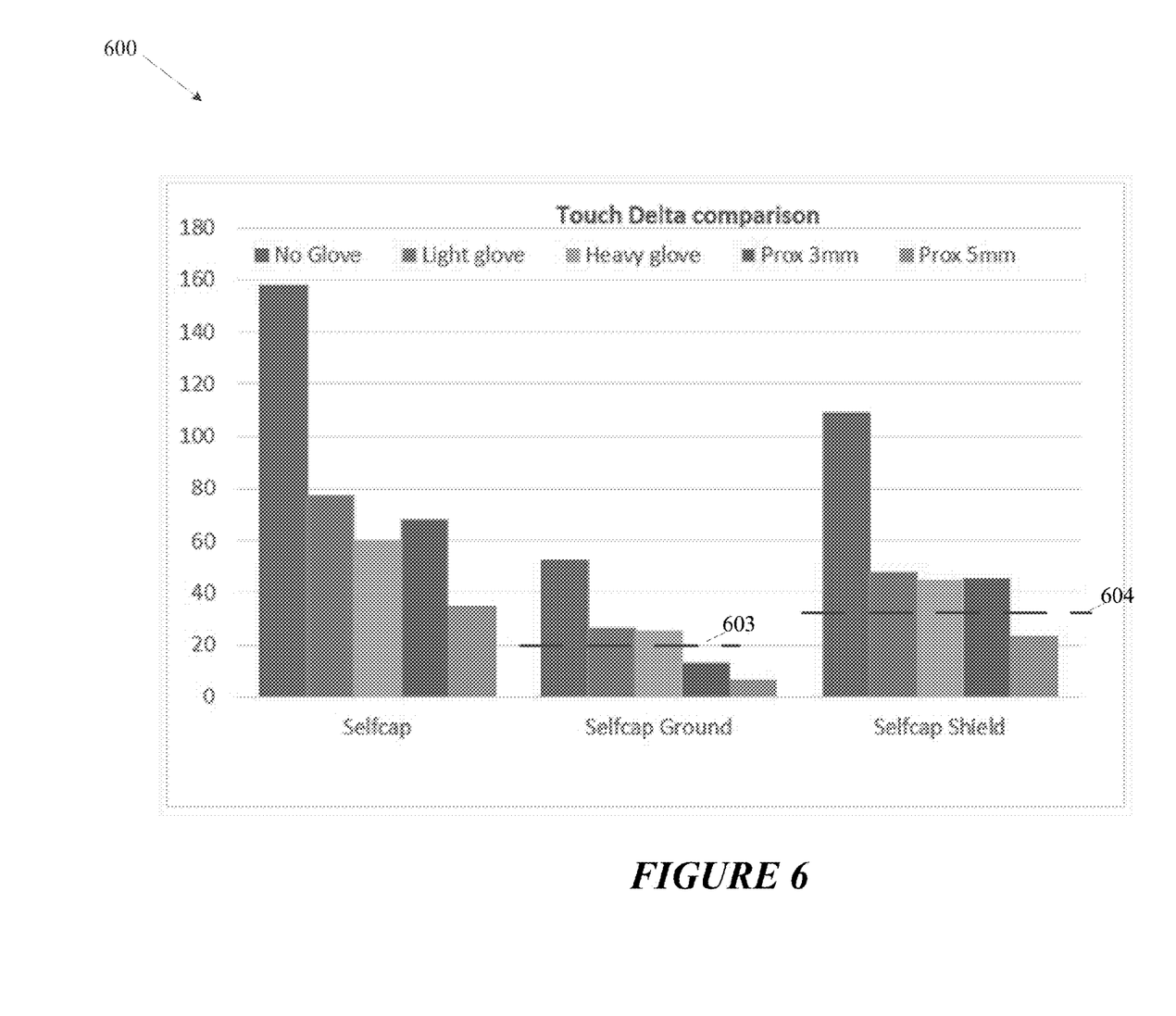
FIG. 6 shows a graph corresponding to a dual measurement calibration method, in accordance with one or more embodiments of the disclosure.

FIG. 6 shows a graph 600 of delta counts for self-cap ground measurement (i.e., grounded-self-cap measurement) and driven-shield self-cap measurement. For each, test measurements were taken using no glove, light glove, and heavy glove in direct physical contact with a front panel layer over the touch sensor. Test measurements were also taken at 3 mm and 5 mm from a touch sensor using a bare finger (i.e., no glove). In this example, 3 mm and 5 mm is measured from an exterior surface of a front panel layer or layers over a touch sensor.

In the example shown in FIG. 6, line 603 is selected as a detection threshold for grounded-self-cap measurements since no glove, light glove, and heavy glove have strong enough capacitive coupling, but at 3 mm and 5 mm capacitive coupling is below the threshold defined by line 603. Line 604 is selected as a detection threshold for grounded-shield self-cap measurements since no glove, light glove and heavy glove have strong enough capacitive coupling, and at 5 mm the capacitive coupling is below the threshold defined by line 604. While at 3 mm proximity touch will be detected by a driven-shield self-cap measurement, it will not be detected by a grounded-shield self-cap measurement, so will not be detected by a dual measurements according to disclosed embodiments.

In some embodiments for calibrating a touch processor for dual measurement some self-cap measurements may be used for informational purposes or not taken at all. In other embodiments for calibrating a touch processor for dual measurements (for example, where projection of the electric field is less of a concern) a determination may be made whether to use a grounded-self-cap measurement or a self-cap measurement for one of the dual measurements after taking test measurements.

Once thresholds 603 and 604 are selected they may be stored at a touch processor (e.g., touch processor 303 of FIG. 3) and used to detect touches for grounded-self-cap measurement and driven-shield self-cap measurements, respectively.

Figure 7:
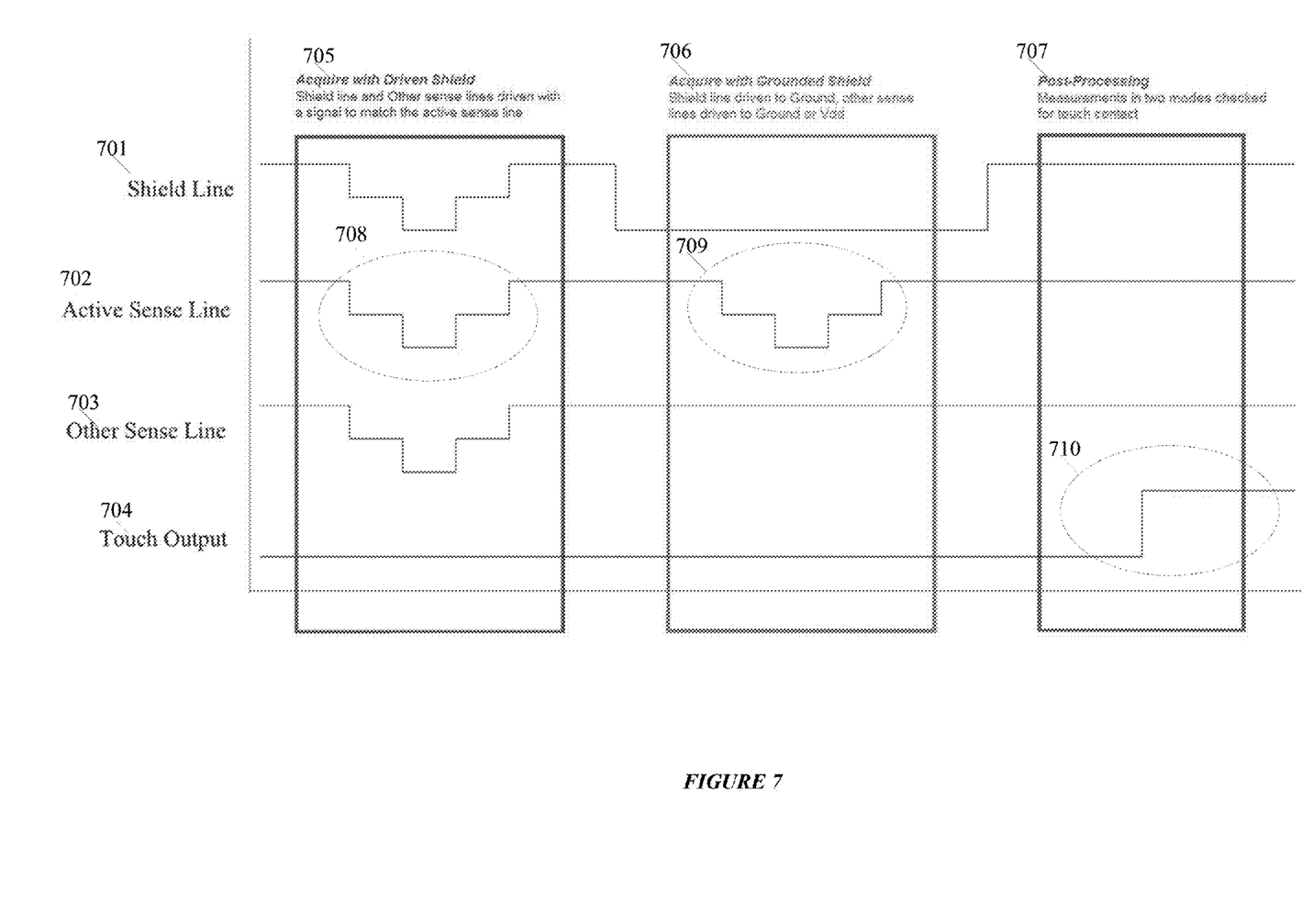
FIG. 7 shows a timing diagram for an example dual touch measurement sensing, in accordance with one or more embodiments of the disclosure.

FIG. 7 shows a timing diagram for an example dual touch measurement sensing, in accordance with one or more embodiments of the disclosure. Shown in FIG. 7 are voltage levels at shield line 701, active sense line 702, other sense line 703, touch output 704. The voltage levels are shown for three phases of a dual touch measurement sensing operation: a self-cap shield-sensing phase 705, a grounded-shield self-cap sensing phase 706, and a post-processing phase 707. In this example, voltage level changes at 708 and 709 measured at active sense line 702 during phases 705 and 706, respectively, are indicative of contact at a touch sensor. During the self-cap shield-sensing phase 705, shield line 701 and other sense lines 703 are driven with a signal to match active sense line 702 while measurements are acquired. During the grounded-shield self-cap sensing phase 706, shield line 701 is driven to ground and other sense lines 703 are driven to ground or Vdd (in the example of FIG. 7, driven to Vdd). During post-processing phase 707, measurements made during phases 705 and 706 are analyzed (not shown) to detect a touch, and touch output 704 is driven to a high voltage level 710 to indicate that a touch was detected.

Many of the functional descriptions in this specification may be illustrated, described or labeled as modules, threads, steps, or other segregations of programming code, including firmware, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices, or the like.

Modules may also be implemented using software or firmware, stored on a physical storage device (e.g., a computer-readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are flash memory and random-access-memory (RAM). Another example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While moisture rejection and proximity rejection are described in connection with one or more embodiments, such description is not meant to require 100% moisture rejection and/or 100% proximity rejection. In other words, the present disclosure encompasses embodiments with a range of moisture rejection and proximity rejection tolerances, including less than 100% moisture rejection and less than 100% proximity rejection, and legal equivalents thereof.

Any characterization in this disclosure of something as 'typical,' 'conventional,' or 'known' does not necessarily mean that it is disclosed in the prior art or that the discussed aspects are appreciated in the prior art. Nor does it necessarily mean that, in the relevant field, it is widely known, well-understood, or routinely used.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

Additional non-limiting embodiments of the disclosure include:

Embodiment 1: A capacitive sensing circuitry, comprising: a sensor comprising electrodes and shielding for the electrodes, the sensor configured to generate measurable signals responsive to capacitive changes at or near the sensor; and a touch controller configured to detect a touch responsive to capacitive sensing measurements performed using the measureable signals, wherein the capacitive sensing measurements comprise: a driven-shield self-capacitance sensing measurement comprising providing a driven-shield signal to at least part of the shielding of the sensor; and a grounded-shield self-capacitance sensing measurement comprising providing a ground signal to at least part of the shielding of the sensor and performing a self-capacitance sensing measurement.

Embodiment 2: The circuitry of Embodiment 1, wherein a first shielding of the shielding for the electrodes comprises: a back conductive material; and a front conductive material, wherein the back conductive material and front conductive material extend within parallel planes.

Embodiment 3: The circuitry of any of Embodiments 1 and 2, wherein the first shielding further comprises conductive materials disposed at lateral sides of the back conductive material and the front conductive material.

Embodiment 4: The circuitry of any of Embodiments 1 through 3, wherein the first shielding is arranged relative to the electrodes to facilitate directionality of electric fields projecting from the electrodes.

Embodiment 5: The circuitry of any of Embodiments 1 through 4, wherein the shielding is arranged relative to the electrodes such that electric fields projecting from the electrodes extend farther in a first direction than in a second direction that is substantially opposite the first direction.

Embodiment 6: The circuitry of any of Embodiments 1 through 5, wherein the touch controller is configured to provide a signal indicative of a touch responsive to the driven-shield self-capacitance sensing measurement and the ground-shield self-capacitive sensing measurement.

Embodiment 7: The circuitry of any of Embodiments 1 through 6, wherein the touch controller is configured to: provide the driven-shield signal to a shield line operatively coupled to the at least part of the shielding of the sensor; provide the driven-shield signal to inactive sense lines of the sensor; and measure first measureable signals at an active sense line of the sensor.

Embodiment 8: The circuitry of any of Embodiments 1 through 7, wherein the touch controller is configured, subsequent to measuring the first measurable signals at the active sense line to: provide a ground signal to the shield line; provide a ground or supply voltage signal to the inactive sense lines of the sensor; and measure second measurable signals at the active sense line of the sensor.

Embodiment 9: A touch processor, comprising: a grounded-shield self-capacitance sensing module configured to perform a self-capacitance sensing measurement after providing a ground signal to a shielding of an electrode of a touch sensor; and a driven-shield self-capacitance sensing module configured to perform a self-capacitance sensing measurement while providing a driven shield to the shielding of the electrode of the touch sensor.

Embodiment 10: The touch processor of Embodiment 9, wherein: the grounded-shield self-capacitance sensing module is configured to detect a first touch responsive to first measurements greater than a first threshold value; the driven-shield self-capacitance sensing module is configured to detect a second touch responsive to second measurements greater than a second threshold value; and the touch processor is configured to report a touch responsive to the detected first touch and the detected second touch.

Embodiment 11: The touch processor of any of Embodiments 9 and 10, wherein the first threshold is selected to reduce susceptibility to proximity touches and the second threshold is selected to reduce susceptibility to moisture touches.

Embodiment 12: The touch processor of any of Embodiments 9 through 11, wherein the processor is configured to not report a touch responsive to one of the ground-shield self-capacitance sensing module and the self-capacitance shield-sensing module detecting a touch and other one not detecting a touch.

Embodiment 13: A dual measurement sensing method, comprising: performing a driven-shield self-capacitance sensing operation; determining a first sensing result responsive to the performed driven-shield self-capacitance sensing operation; performing a grounded-shield self-capacitance sensing operation; determining a second sensing result responsive to the performed grounded-shield self-capacitance sensing operation; and determining a touch result responsive to the first sensing result and the second sensing result.

Embodiment 14: The method of Embodiment 13, wherein the determining the first sensing result comprises: receiving first measurements acquired responsive to the performed driven-shield self-capacitance sensing operation; comparing the first measurements to a first threshold; and determining the first sensing results responsive to the first measurements.

Embodiment 15: The method of any of Embodiments 13 and 14, wherein the determining the second sensing result comprises: receiving second measurements acquired responsive to the performed grounded-shield self-capacitance sensing operation; comparing the second measurements to a second threshold; and determining the second sensing result responsive to the second measurements.

Embodiment 16: The method of any of Embodiments 13 through 15, wherein the determining the touch result comprises: detecting a touch responsive to the first sensing result and the second sensing result both corresponding to a touch.

Embodiment 17: A capacitive sensing system, comprising: a sensor comprising electrodes and sense lines; an acquisition circuitry operatively coupled to the sense lines; and a touch processor operatively coupled to the acquisition circuitry and the sensor, the touch processor configured to detect a touch responsive to a first capacitive sensing measurement and a second capacitive sensing measurement, wherein one of the first and second capacitive sensing measurement is characterized by moisture tolerance and the other of the first and second capacitive sensing measurement is characterized by proximity detection tolerance.

Embodiment 18: The system of Embodiment 17, wherein the one of the first and the second capacitive sensing measurements that is characterized by moisture tolerance is a driven-shield capacitive sensing measurement.

Embodiment 19: The system of any of Embodiments 17 and 18, wherein the one of the first and the second capacitive sensing measurements that is characterized by proximity tolerance is a grounded-shield capacitive sensing measurement.

Embodiment 20: The system of any of Embodiments 17 through 19, wherein the sensor further comprises shielding arranged to facilitate directionality of electric fields projecting from the electrodes.

We claim:

1. A capacitive sensing circuitry, comprising:
   a sensor comprising electrodes and shielding for the electrodes, the sensor configured to generate measurable signals responsive to capacitive changes at or near the sensor; and
   a touch controller configured to:
   perform a capacitive sensing measurement using the measureable signals, the capacitive sensing measurement comprising:
   a driven-shield self-capacitance sensing measurement comprising providing a driven-shield signal to at least part of the shielding of the sensor; and
   a grounded-shield self-capacitance sensing measurement comprising providing a ground signal to at least part of the shielding of the sensor and performing a self-capacitance sensing measurement; and
   detect a touch responsive to both:
   a determination that the driven-shield self-capacitance sensing measurement exceeds a first threshold value; and
   a determination that the grounded-shield self-capacitance sensing measurement exceeds a second threshold value, the second threshold value different from the first threshold value.

2. The circuitry of claim 1, wherein a first shielding of the shielding for the electrodes comprises:
   a back conductive material; and
   a front conductive material,
   wherein the back conductive material and front conductive material extend within parallel planes.

3. The circuitry of claim 2, wherein the first shielding further comprises conductive materials disposed at lateral sides of the back conductive material and the front conductive material.

4. The circuitry of claim 1, wherein the shielding is arranged relative to the electrodes to facilitate directionality of electric fields projecting from the electrodes.

5. The circuitry of claim 4, wherein the shielding is arranged relative to the electrodes such that electric fields projecting from the electrodes extend farther in a first direction than in a second direction that is substantially opposite the first direction.

6. The circuitry of claim 1, wherein the touch controller is configured to provide a signal indicative of a touch responsive to the driven-shield self-capacitance sensing measurement and the grounded-shield self-capacitive sensing measurement.

7. The circuitry of claim 1, wherein the touch controller is configured to:
   provide the driven-shield signal to a shield line operatively coupled to the at least part of the shielding of the sensor;
   provide the driven-shield signal to inactive sense lines of the sensor; and
   measure first measureable signals at an active sense line of the sensor.

8. The circuitry of claim 7, wherein the touch controller is configured, subsequent to measuring the first measurable signals at the active sense line to:
   provide a ground signal to the shield line;
   provide a ground or supply voltage signal to the inactive sense lines of the sensor; and
   measure second measurable signals at the active sense line of the sensor.

9. The circuitry of claim 1, wherein the touch controller is configured to determine that the driven-shield self-capacitance sensing measurement exceeds the first threshold value independently from the grounded-shield self-capacitance sensing measurement.

10. A touch processor, comprising:
    a computer-readable media having computer-readable instructions stored thereon; and
    a processing core configured to execute the computer-readable instructions, the computer readable instructions including modules of executable code, the modules of executable code including:
    a grounded-shield self-capacitance sensing module configured to perform a self-capacitance sensing measurement after providing a ground signal to a shielding of an electrode of a touch sensor; and
    a driven-shield self-capacitance sensing module configured to perform a self-capacitance sensing measurement while providing a driven shield to the shielding of the electrode of the touch sensor;
    wherein the processing core is configured to report a touch responsive to both:
    a determination, by the grounded-shield self-capacitance sensing module, that the self-capacitance sensing measurement after providing the ground signal to the shielding exceeds a first threshold value; and
    a determination, by the driven-shield self-capacitance sensing module, that the self-capacitance sensing measurement while providing the driven shield exceeds a second threshold value, the second threshold value different from the first threshold value.

11. The touch processor of claim 10, wherein the second threshold value is greater than the first threshold value.

12. The touch processor of claim 10, wherein the first threshold value is selected to reduce susceptibility to proximity touches and the second threshold value is selected to reduce susceptibility to moisture touches.

13. The touch processor of claim 10, wherein the driven-shield self-capacitance sensing module is configured to determine that the self-capacitance sensing measurement exceeds the second threshold value independently from the self-capacitance sensing measurement of the grounded-shield self-capacitance sensing module.

14. A dual measurement sensing method, comprising:
    performing a driven-shield self-capacitance sensing operation;
    determining a first sensing result responsive to determining that a first measurement of the performed driven-shield self-capacitance sensing operation exceeds a first threshold value;
    performing a grounded-shield self-capacitance sensing operation;
    determining a second sensing result responsive to determining that a second measurement of the performed grounded-shield self-capacitance sensing operation exceeds a second threshold value, the second threshold value different from the first threshold value; and
    determining a touch result responsive to both the first measurement exceeding the first threshold value and the second sensing result exceeding the second threshold value.

15. The method of claim 14, wherein the first threshold value is greater than the second threshold value.

16. The method of claim 15, wherein determining the first sensing result responsive to determining that a first measurement of the performed driven-shield self-capacitance sensing operation exceeds the first threshold value comprises determining that the first measurement exceeds the first threshold value independently from the second measurement.

17. A capacitive sensing system, comprising:
a sensor comprising electrodes and sense lines;
an acquisition circuitry operatively coupled to the sense lines; and
a touch processor operatively coupled to the acquisition circuitry and the sensor, the touch processor configured to detect a touch event responsive to both a first capacitive sensing measurement exceeding a first threshold value and a second capacitive sensing measurement exceeding a second threshold value, the second threshold value different from the first threshold value, wherein one of the first and second capacitive sensing measurements is characterized by moisture tolerance and the other of the first and second capacitive sensing measurements is characterized by proximity detection tolerance.

18. The system of claim 17, wherein the one of the first and the second capacitive sensing measurements that is characterized by moisture tolerance is a driven-shield capacitive sensing measurement.

19. The system of claim 17, wherein the one of the first and the second capacitive sensing measurements that is characterized by proximity tolerance is a grounded-shield capacitive sensing measurement.

20. The system of claim 17, wherein the sensor further comprises shielding arranged to facilitate directionality of electric fields projecting from the electrodes.

* * * * *